United States Patent
Garcia (10) Patent No.: US 8,688,282 B2
(45) Date of Patent: Apr. 1, 2014

(54) METHOD AND SYSTEM FOR CONTROLLING A WIND POWER PLANT COMPRISING A NUMBER OF WIND TURBINE GENERATORS

(75) Inventor: Jorge Martinez Garcia, Risskov (DK)

(73) Assignee: Vestas Wind Systems A/S, Aarhus N. (DK)

( * ) Notice: Subject to any disclaimer, the term of this patent is extended or adjusted under 35 U.S.C. 154(b) by 290 days.

(21) Appl. No.: 13/000,175

(22) PCT Filed: Jun. 25, 2009

(86) PCT No.: PCT/EP2009/057943
§ 371 (c)(1),
(2), (4) Date: Feb. 16, 2011

(87) PCT Pub. No.: WO2010/000663
PCT Pub. Date: Jan. 7, 2010

(65) Prior Publication Data
US 2011/0153099 A1   Jun. 23, 2011

Related U.S. Application Data

(60) Provisional application No. 61/076,932, filed on Jun. 30, 2008.

(30) Foreign Application Priority Data

Jun. 30, 2008  (DK) ................................ 2008 00910

(51) Int. Cl.
*G05D 3/12* (2006.01)
*F03D 9/00* (2006.01)
(52) U.S. Cl.
USPC ............................. 700/287; 290/44; 700/286

(58) Field of Classification Search
USPC ...................... 700/286, 287; 290/44
See application file for complete search history.

(56) References Cited

U.S. PATENT DOCUMENTS 3,652,838  A  *  3/1972  Dillon et al. .................. 700/295
6,566,764  B2 *  5/2003  Rebsdorf et al. ................ 290/44

(Continued)

FOREIGN PATENT DOCUMENTS

DE   10 2005 026 062   4/2007
EP   1 467 463   10/2004

(Continued)

OTHER PUBLICATIONS

Sorensen et al., "Wind Farm Models and Control Strategies" Energi 2, 2005, 63 pages.*

(Continued)

*Primary Examiner* — Kavita Padmanabhan
*Assistant Examiner* — Thomas Stevens
(74) *Attorney, Agent, or Firm* — Patterson & Sheridan, LLP (57) ABSTRACT

This invention relates to a method and a system for controlling a wind power plant to deliver power to the power network. A frequency of the power network is detected. A variation rate in the detected frequency of the power network is calculated. A requested variation of delivered power for the wind power plant is calculated based on a value of the inertia of the wind power plant and the calculated frequency variation rate. A requested variation of delivered power for each wind turbine generator of the wind power plant is calculated based on the calculated requested variation of delivered power of the wind power plant and a current power level of each wind turbine generator. The resulting calculated requested power variation is then used for controlling each wind turbine generator to deliver power to the network.

20 Claims, 5 Drawing Sheets

(56) References Cited

U.S. PATENT DOCUMENTS

| | | | |
|---|---|---|---|
| 6,670,721 B2* | 12/2003 | Lof et al. | 290/44 |
| 6,672,054 B2* | 1/2004 | Merswolke et al. | 60/398 |
| 7,345,373 B2* | 3/2008 | Delmerico et al. | 290/44 |
| 7,761,190 B2* | 7/2010 | Delmerico et al. | 700/297 |
| 7,898,099 B2* | 3/2011 | Stiesdal | 290/44 |
| 2005/0028017 A1* | 2/2005 | Janakiraman et al. | 713/340 |
| 2006/0033338 A1* | 2/2006 | Wilson | 290/44 |
| 2006/0071554 A1* | 4/2006 | McNamara et al. | 307/10.1 |
| 2007/0085343 A1 | 4/2007 | Fortmann | |
| 2007/0120369 A1* | 5/2007 | Delmerico et al. | 290/44 |
| 2007/0173982 A1* | 7/2007 | Cardinal et al. | 700/286 |
| 2007/0193744 A1* | 8/2007 | Bridges | 166/272.1 |
| 2008/0195255 A1* | 8/2008 | Lutze et al. | 700/291 |
| 2008/0252076 A1* | 10/2008 | Fortmann et al. | 290/44 |
| 2009/0129953 A1* | 5/2009 | Andersen | 417/334 |
| 2009/0171509 A1* | 7/2009 | Lindahl et al. | 700/292 |
| 2009/0326726 A1* | 12/2009 | Ippolito et al. | 700/291 |
| 2012/0161444 A1* | 6/2012 | Tarnowski | 290/44 |

FOREIGN PATENT DOCUMENTS

| | | |
|---|---|---|
| WO | 01/69754 | 9/2001 |
| WO | 2008/040350 | 4/2008 |

OTHER PUBLICATIONS

Anaya-Lara et al., "Contribution of DFIG-based wind farms to power system short-term frequency regulation", 2006, p. 164-170.*

Enguerran Despis; International Search Report and Written Opinion issued in international priority application No. PCT/EP2009/057943; Oct. 20, 2009; 9 pages; European Patent Office.

* cited by examiner

METHOD AND SYSTEM FOR CONTROLLING A WIND POWER PLANT COMPRISING A NUMBER OF WIND TURBINE GENERATORS

TECHNICAL FIELD

The present invention relates to a method and a system for controlling a wind power plant, or a cluster of wind power plants, each wind power plant comprising a number of wind turbine generators, the wind power plant(s) being connected to an external power network. Especially, the invention relates to a method and a system for controlling the real power output of such a wind power plant, or cluster of wind power plants, for contributing to frequency stabilization in the power network.

BACKGROUND OF THE INVENTION

A wind power plant comprises a number of wind turbine generators (WTG), each comprising a turbine connected to a generator for converting mechanical energy in the turbine to electrical energy. The wind power plant is further connected to an electrical power network for providing the electrical energy generated by the WTGs to the power network.

The power network should have defined parameters, in particular a defined voltage and a defined frequency, e.g. 50 Hz. The stability of the power network parameters is dependent on a variety of variables including the balance between generated power and consumed power in the network at every instant. Any imbalance leads to changes in the network frequency. When more power is generated than is consumed in the network, the frequency increases. When more power is consumed than generated, the frequency decreases. It is important to have a stable frequency in the network, i.e. to keep the frequency fluctuations as small as possible.

In a wind-driven power plant, each wind turbine is preferably driven at a variable speed, which speed is adapted to the wind speed, for performance reasons and because otherwise there is an increase in the stress suffered by the mechanical parts of the turbine. Since the turbines are driven at variable speed, their individual rotational speed is decoupled from the frequency of the power network. Consequently, there is some freedom between the frequency of the power network and the rotational speed of the turbines, which means that the power delivered by a wind power plant is independent of the current frequency of the power network.

Since, generally, the number of wind power plants in a power network increases, there is an increasing demand from network operators to be able to control the power delivered by the wind power plants according to frequency variations in the network.

EP1467463 and US2007/0085343 deals with controlling the real power output of a wind power plant connected to a power network to contribute to power network stabilization by controlling the real power output of the wind power plant depending on the value of the network frequency. I.e. when the frequency is high in the network, the wind power plant is controlled to decrease the real power provided to the network, and vice versa. US 2007/0085343 especially discusses using the inertia of the wind turbines for, at low network frequencies, being able to deliver more power than nominal power to the network for a short period. Although, such a frequency stabilisation could only be useable for a short while. Thereby, it is important to control the use of the inertia such that it is not used too long such that the rotational speed of the turbines will become too low or even stop.

There is a need for alternative ways of controlling the real power output of a wind power plant to be able to contribute to power network frequency stabilization.

SUMMARY OF THE INVENTION

In view of the above, it is an object of the present invention to control the real power output of a wind power plant to contribute to frequency stabilization in a power network to which the wind power plant is connected.

It is another object of the invention to provide network operators with tools and methods useful for contributing to power network frequency stabilization.

It is another object of the invention to make a wind power plant imitate the behaviour of a synchronous power plant.

It is yet another object of the invention to control the wind power plant to achieve damping of frequency variations of the power network.

According to a first aspect, the present invention is realized by a method for controlling a wind power plant comprising at least one wind turbine generator, the wind power plant being connected to a power network for delivering power to the power network. The method comprises:

detecting a frequency of the power network;
  calculating a variation rate in the detected frequency of the power network;
  calculating a requested variation of delivered power for the wind power plant based on a value of the inertia of the wind power plant and the calculated frequency variation rate;
  calculating a requested variation of delivered power for each wind turbine generator of the wind power plant based on the calculated requested variation of delivered power for the wind power plant and a current power level of each wind turbine generator.

The resulting calculated requested power variation is then used for controlling each wind turbine generator to deliver power to the network.

By controlling the power output of the wind power plant based on the frequency variation rate of the power network, a similar behaviour to the behaviour of a synchronous power plant can be achieved. This is advantageous for an operator of the power network since a synchronous power plant has a natural behaviour that is advantageous when it comes to damping frequency variations in the power network.

According to an embodiment of the invention, the requested variation of delivered power for the wind power plant is further calculated using a value of the detected frequency of the power network. By calculating requested power variation using a detected frequency value of the power network, in addition to using the frequency variation rate and the inertia of the wind power plant, a requested power variation that is proportional to the nominal power of the wind power plant is achieved. This is a rather good estimation of the power that can be delivered into the power network, while at the same time the estimation is easy to calculate.

According to another embodiment of the invention, the requested variation of delivered power for the wind power plant is further calculated based on a variable proportional to energy residing in the rotational masses of the wind power plant. By calculating requested power variation based on a variable proportional to energy residing in the rotational masses of the power plant, in addition to using the frequency variation rate and the inertia of the wind power plant, the requested power variation is well adapted to the actual energy of the inertia: At low power output, the variation of power will be low, which is good for the wind power plant, since the power band of operation is narrow. At high power output, the variation of power can be high, which gives more controlling possibilities for the network operator to control the network frequency.

According to yet another embodiment, the method further comprises detecting an incoming wind speed at the wind power plant, and the variable proportional to energy residing in the rotational masses of the wind power plant is the detected incoming wind speed at the wind power plant. By using incoming wind speed, the calculation of requested power variation will be up to date or even before date since incoming wind speed can be used for forecasting energy residing in the rotational masses for the following seconds. Also, the equivalent inertia emulated will follow the wind speed such that if there is light wind, a small synchronous power plant is emulated and if there is strong wind, a large synchronous power plant is emulated.

According to still another embodiment, the variable proportional to energy residing in the rotational masses of the wind power plant is the current total power delivered by the wind power plant to the power network. By using the total power, a non-complicated calculation is achieved that for most applications result in a satisfactory result.

According to another embodiment, the method further comprises the step of: if the detected frequency is below a threshold minimum value, calculating the frequency variation rate by using the threshold minimum value instead of the detected frequency. Thereby, the risk of using too much energy from the rotational masses resulting in a too low rotational speed is avoided.

According to yet another embodiment, the method further comprises the steps of: comparing the calculated frequency variation rate to a threshold value, and controlling each wind turbine generator according to the method only if the calculated frequency variation rate exceeds the threshold value. Thereby, the control method of the invention is limited to be used when frequency changes in network are severe enough, such that data resources are saved.

According to another embodiment, in which the wind power plant further comprises a power storage device, the method further comprises: calculating a requested variation of delivered/absorbed power for the power storage device based on the calculated requested variation of delivered power for the wind power plant; and controlling the power storage device according to its requested power variation. Thereby, the wind power plant becomes a very flexible resource when it comes to contributing to frequency stabilization in the power network, since either only the WTGs are used, or the power storage device is used for delivering power at the same time as the WTGs, or only the power storage device is used for delivering power to the network, or for absorbing power from the network and/or from the WTGs.

According to a second aspect, the present invention is realized by a system for controlling a wind power plant comprising at least one wind turbine generator, wherein the wind power plant is connected to a power network. The system comprises:

A detection unit for detecting a frequency of the power network;

A first calculation means for calculating a variation rate in the detected frequency of the power network;

A second calculation means for calculating a requested variation of delivered power for the wind power plant based on a value of the inertia of the wind power plant and the calculated frequency variation rate;

A third calculation means for calculating a requested variation of delivered power for each wind turbine generator of the wind power plant based on the calculated requested variation of delivered power for the wind power plant and a current power level of each wind turbine generator;

A control unit for controlling each wind turbine generator to deliver power to the network according to its calculated requested power variation.

By arranging the control system to control the power output of the wind power plant based on the frequency variation rate of the power network, a similar behaviour to the behaviour of a synchronous power plant can be achieved. This is advantageous for an operator of the power network since a synchronous power plant has a natural behaviour that is advantageous when it comes to damping frequency variations in the power network.

According to an embodiment of the second aspect, the system comprises a first calculation section for calculating the variation rate in the detected frequency of the power network for positive frequency variations and a second calculation section for calculating the variation rate in the detected frequency of the power network for negative frequency variations. Thereby, negative and positive frequency variations could be treated differently. For example, for negative frequency variation, a separate minimum frequency calculation could thus be used. Also, independent threshold values could easily be implemented for negative as for positive frequency variations.

According to a third aspect of the invention, the present invention is realized by a computer program product arranged for causing a computer of a control system to perform the steps according to any of the claims according to the first aspect of the invention.

Other objectives, features and advantages of the present invention will appear from the following detailed disclosure, from the attached claims as well as from the drawings.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. As an example, the term "a wind power plant" should be interpreted as at least one wind power plant, e.g. a cluster of power plants. Further, the steps of any method disclosed herein do not have to be performed in the exact order disclosed, unless explicitly stated.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein.

DETAILED DESCRIPTION OF PREFERRED EMBODIMENTS

Figure 1:
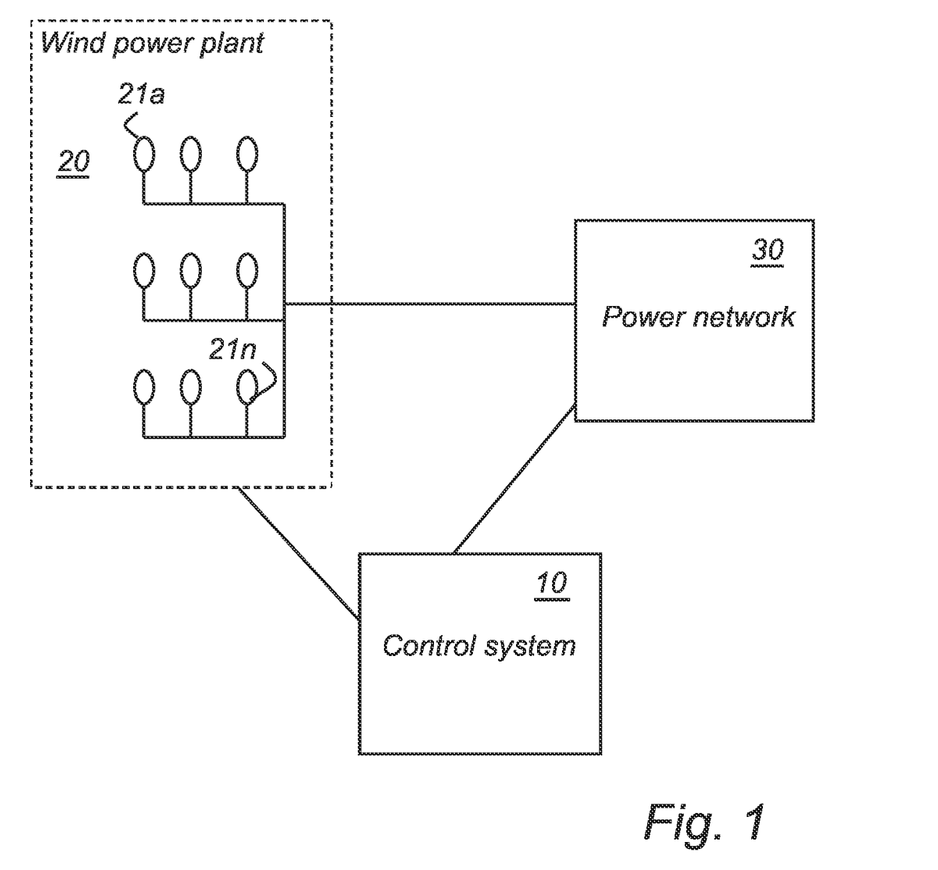
FIG. 1 illustrates a schematic block diagram of a power system for which a control system according to the invention could be used.

FIG. 1 shows a power system having a wind power plant 20 that is connected to an external power network 30. The power network comprises a number of loads and generators, i.e. power plants. The wind power plant comprises a number of wind turbine generators, WTGs, 21*a-n*. In such a power network it is necessary to achieve balance between generated power and consumed power in the network at every instant. Otherwise, the frequency of the network will fluctuate, which will negatively affect the connected loads and power plants. FIG. 1 further comprises a control system 10 for controlling the real power output of the wind power plant 20 in accordance with the invention.

In conventional synchronous power plants, such as nuclear power plants or fossil driven power plants, the turbines work at a rotational speed which is proportional to the frequency of the power network to which the plant is connected. For example, the rotational speed of the turbines is coupled to the frequency power network. In such plants, if the frequency of the network changes, the rotational speed of the turbines has to follow the frequency change. For example, if the frequency goes down, the power plant delivers more power than its nominal power during the network frequency change, to be able to follow the frequency of the network. For example, energy from the inertia of the rotor is delivered to lower the rotational speed. Such a forced behaviour is of benefit to the power network since fast changes in frequency of the power network is automatically dampened. Fast frequency changes can be especially vulnerable to the power network.

The wind power plant 20 is controlled via control system 10 to emulate the natural behaviour of a synchronous power plant such that the wind power plant reacts to frequency variations in the power network in a similar way as a synchronous power plant would react to frequency variations in the power network.

In the following, the theoretical background is described, on which the methods and systems of the invention are based.

The energy stored in a rotational mass is given by:

$$E = \frac{J\omega^2}{2}, \quad (1)$$

wherein J=inertia and ω=rotational speed.

Consequently, the power stored in rotational mass is given by:

$$P = J\omega \frac{d\omega}{dt} \quad (2)$$

For a synchronous machine, the rotational speed is proportional to the power network frequency $$\omega = f(\text{network frequency}) \sim k*f \quad (3)$$

Combining formulas (2) and (3) above, the power stored in a rotational mass of a synchronous machine is $$P = Jk_1 f \frac{df}{dt}, \quad (4)$$

where f is the network frequency

As mentioned, since the rotational speed of a synchronous machine is directly proportional to the frequency of the network, it has to follow the frequency of the network, taking energy from its rotational mass at negative frequency changes and giving energy to its rotational mass at positive frequency changes. Consequently, rotational energy variations after a disturbance for a synchronous machine will be approximately the following (neglecting losses and the energy stored in the compressed shaft):

$$E_i - E_f = \frac{J(\omega_i^2 - \omega_f^2)}{2} = \frac{Jk^2(f_i^2 - f_f^2)}{2}, \quad (5)$$

wherein $E_i$=energy at frequency i and $E_f$=energy at frequency f.

The power delivered by a synchronous machine due to these frequencies disturbances is thus dependent on its rotational speed, frequency change rate and mass.

As shown in formula (4), power delivered/absorbed by a rotational mass is proportional to the rotational frequency variation rate. According to the invention, a wind power plant is modelled to behave as a synchronous machine with fixed speed rotating inertia. Consequently, the wind power plant is controlled via control system 10 to change its real power output proportional to the variation rate of the frequency of the power network, i.e. how fast the frequency changes.

Figure 2:
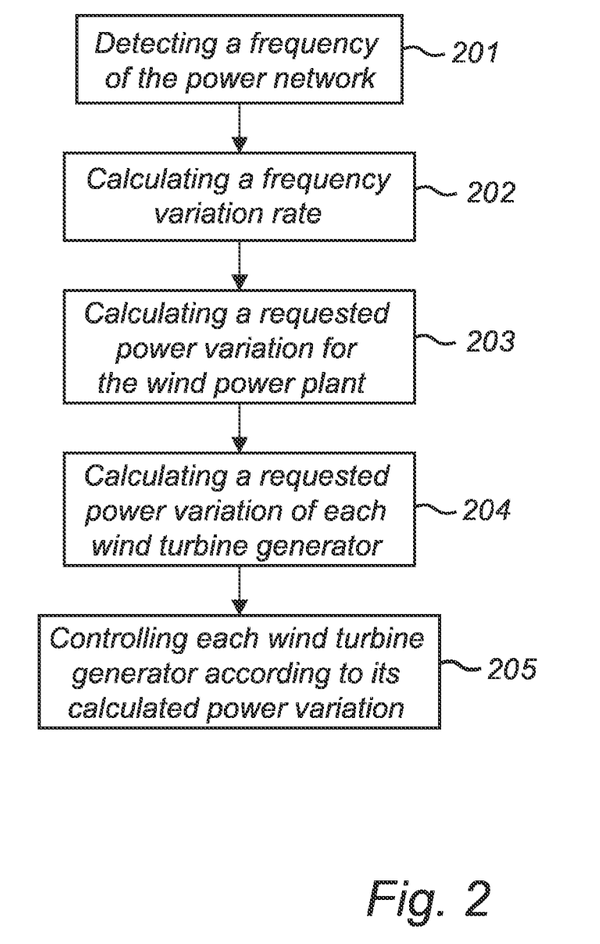
FIG. 2 shows a flow chart of a method for controlling a wind power plant according to an embodiment of the invention.

FIG. 2 shows a method according to the invention for controlling a wind power plant that is connected to a power network for delivering power to the power network. The method comprises the following steps:

detecting 201 a frequency of the power network;

calculating 202 a variation rate in the detected frequency of the power network;

calculating 203 a requested variation of delivered real power for the wind power plant based on a value of the inertia of the wind power plant and the calculated frequency variation rate;

calculating 204 a requested variation of delivered power for each wind turbine generator of the wind power plant based on the calculated requested variation of delivered real power for the wind power plant and a current power level of each wind turbine generator;

controlling 205 each wind turbine generator to deliver power to the network according to its calculated requested real power variation.

The frequency detected according to the invention is the main frequency, or the basic frequency of the power network.

A computer program product could be arranged to carry out the method when run on a computer. The computer program may be arranged to carry out steps 201-204 or all steps 201-205.

Figure 3:
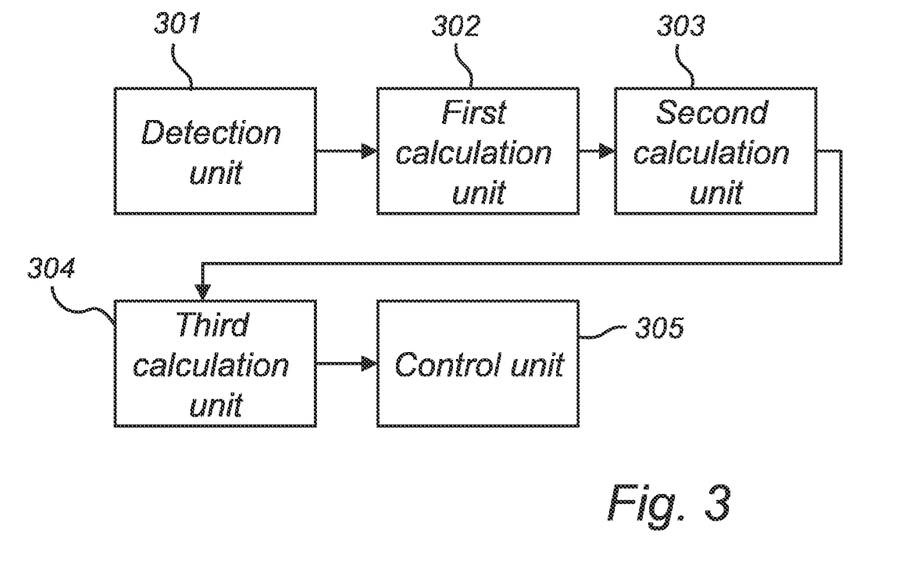
FIG. 3 is a schematic block diagram of a system for controlling a wind power plant according to an embodiment of the invention.

FIG. 3 shows an embodiment of the control system 10 according to the invention for controlling power output of a wind power plant connected to a power network.

The system comprises:

A detection unit 301 for detecting a frequency of the power network;

A first calculation means 302 for calculating a variation rate in the detected frequency of the power network;

A second calculation means 303 for calculating a requested variation of delivered power for the wind power plant based on a value of the inertia of the wind power plant and the calculated frequency variation rate;

A third calculation means 304 for calculating a requested variation of delivered power for each wind turbine generator of the wind power plant based on the calculated requested variation of delivered power for the wind power plant and a current power level of each wind turbine generator;

A control unit 305 for controlling each wind turbine generator to deliver power to the network according to its calculated requested power variation.

The control unit 305 may be a unit separate from the rest of the control system. The first calculation means may further comprise a filter for filtering out frequency variation rates that are below a defined threshold value. The system may also comprise a filter for filtering out transient frequency variations. I.e. frequency variations that are very short in time, e.g. shorter than a defined threshold value. Further, the first, second and third calculation means may be arranged in one and the same unit or in different units.

Figure 4:
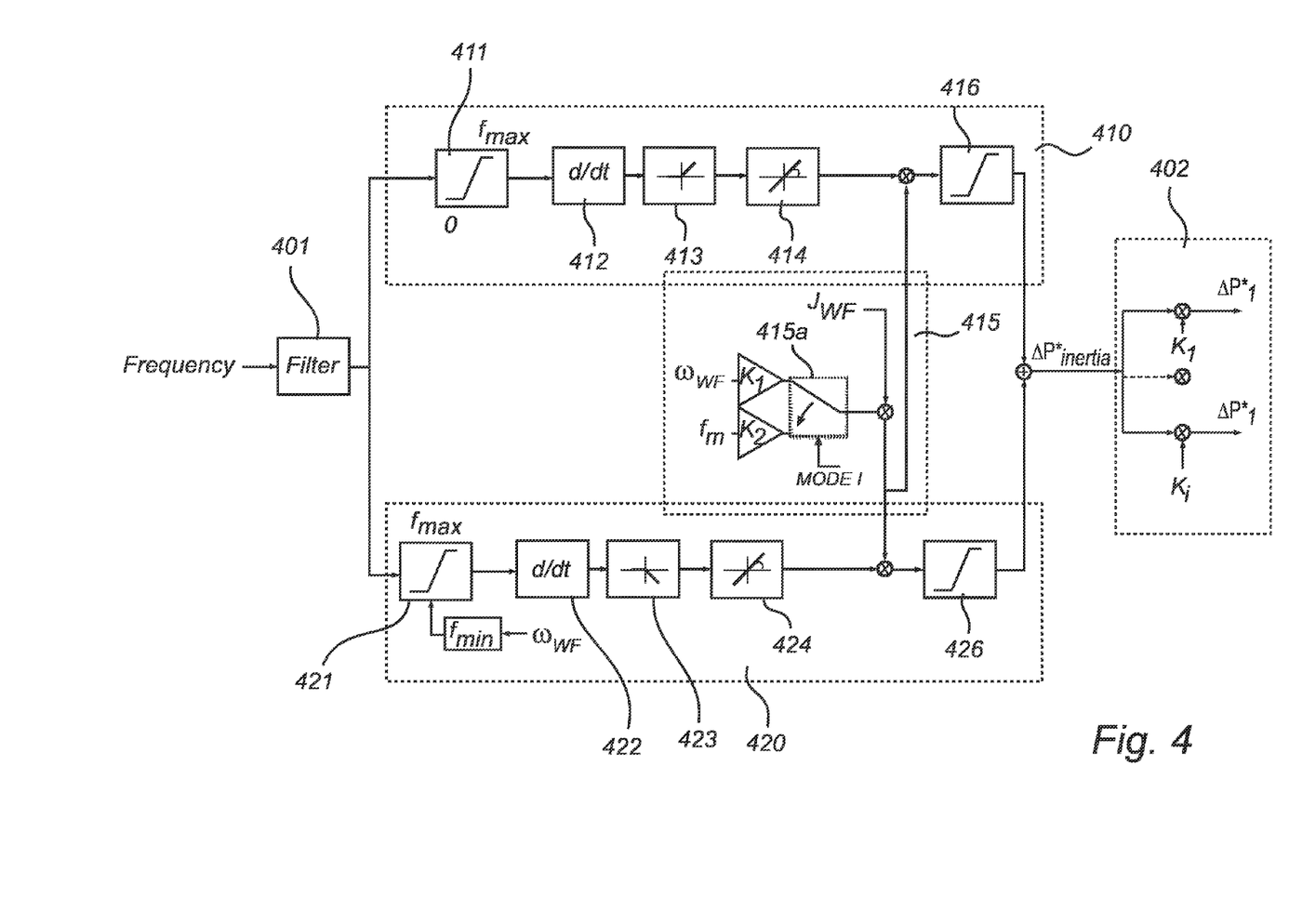
FIG. 4 is a schematic block diagram of another embodiment of a system for controlling a wind power plant.

FIG. 4 shows an embodiment of the control system 10 for controlling power output of a wind power plant.

The control system 10 is arranged to detect network frequency values, or to receive detected network frequency values. The control system 10 comprises a filter 401 for blocking small frequency variations. For example, frequency variations that are lower than a predetermined value are blocked, or for reducing slope change in the frequency variation.

The control system 10 further comprises a first section 410 for treating positive frequency variations and a second section 420 for treating negative frequency variations, each section being connected to the filter 401 for blocking small frequency variations. By using separate sections for treating negative and positive frequency variations, it is possible to use independent settings for negative and positive frequency variations in hard limiters 411, 421 and ramp limiters 414, 424.

The first section 410 comprises a first hard limiter 411 connected to the filter 401. The hard limiter 411 is arranged to filter out, or block, frequencies above a certain level $f_{max}$.

The first section further comprises a first calculation means 412 connected to the hard limiter 411 for calculating a frequency variation rate for the detected frequency values by a derivation of the frequency. The first section 410 further has a frequency filter 413 connected to the first calculation means 412 for blocking negative frequency variations, and a ramp filter 414 connected to the frequency filter 413 for blocking frequency variations that are more steep than a predetermined threshold value, i.e. where the frequency is changed very quickly. In an embodiment, the frequency filter 413 may also block positive frequency variations that are lower than a certain threshold value.

Consequently, frequency variations are greater than a threshold value, are positive and are not too steep in time will proceed to the next unit, which is a second calculation means 415 for calculating a requested variation of delivered power for the wind power plant. Using the frequency detected at the power network, a proportional real power variation for the wind power plant is calculated in the second calculation means 415 based on a total inertia $J_{wF}$ of the wind power plant and the frequency variation rate $\Delta f/\Delta t$. In connection with FIG. 5, a more detailed description of different embodiments for calculating the power variation of the wind power plant will be described. The first section further comprises a second limiter 416 for limiting the output signal level of the control system 10.

The second section 420 for treating negative frequency variations comprises a first hard limiter 421 connected to the filter 401 for filtering out, or blocking, frequencies above a certain level $f_{max}$. The second section further comprises a first calculation means 422 connected to the hard limiter 421 for calculating a frequency variation rate for the detected frequency variation. The second section 420 further has a frequency filter 423 connected to the first calculation means 422 for blocking positive frequency variations, and a ramp limiter 424 connected to the frequency filter 423 for blocking frequency variations that are more steep than a predetermined threshold value, i.e. where the frequency is changed very quickly. The frequency filter 423 may also block negative frequency variations that are lower than a certain threshold value.

Consequently, frequency variations are greater than a threshold value, are negative and are not too steep in time will proceed to the next unit, which is a second calculation means 415 for calculating a requested variation of delivered power for the wind power plant. Using the frequency values detected at the power network, a proportional power variation for the wind power plant is calculated in the second calculation means 415 based on a total inertia $J_{wF}$ of the wind power plant and the frequency variation rate $\Delta f/\Delta t$. In connection with FIG. 5, a more detailed description of different embodiments for calculating the power variation of the wind power plant will be described. The second section further comprises a second limiter 426 for limiting the output signal level of the control system 10.

For positive frequency variations, there is not a problem to decrease the power delivered by the wind power plant. Although, for negative frequency variations, it will be necessary to increase power delivered by the wind power plant over what is actually received from the wind. Such a measure would mean that kinetic energy from the rotors of the WTGs in the wind power plant is used for a short while, thereby decreasing the rotational speed of the rotors. To avoid decreasing the rotational speed of the rotors too much, it is necessary to define how much kinetic energy that can be taken out of the rotors of the wind power plant. As an alternative, as described further down, the wind power plant may have a power storage device, and excess power can be taken from the power storage device instead of from the kinetic energy of the rotors, or excess power may be taken from both the kinetic energy of the rotors and from the power storage devices.

As mentioned, the wind power plant is emulated onto a theoretical synchronous machine with a given inertia, either calculated as the total inertia of the rotors of the wind power plant or calculated/selected according to any other criteria. A minimum allowed rotational speed $\omega_{min}$ is defined for the WTG. Inserting $\omega_{min}$ in formula (5), a lowest possible power network frequency $f_{min}$ that can be used for the synchronous machine is calculated according to the following:

$$f_{min}^2 = \frac{\omega_{min}^2 - \omega_i^2}{k^2} + f_i^2, \qquad (6)$$

where index i=initial value, before disturbance and index min=minimum.

The calculated minimum frequency is used in the hard limiter 421 of the second section, if necessary. This is accomplished such that if the detected power network frequency is lower than $f_{min}$ $f_{min}$ is used in the following part of the calculation instead of the detected power network frequency.

The control system 10 further comprises a third calculation means 402 that based on the calculated power variation for the wind power plant and the current power level for each individual WTG calculates the ΔP level for each individual WTG. One or all of the calculation means could be arranged inside a SCADA (Supervisory Control and Data Acquisition) unit. The calculation performed in the third calculation means could be performed based on the inertia of each WTG and the present power delivered by each WTG.

Two different strategies could be implemented for emulating the inertia of a synchronous machine. In a first strategy, the calculated output power variation of the synchronous machine equivalent is proportional to a design power of the wind power plant, i.e. a nominal power of the wind power plant. In that case, the inertia is proportional to the grid frequency, which means that the following calculation will be performed in the second calculation means 415:

$$\Delta P = J_{WF} * f_m * k_2 * \frac{\Delta f}{\Delta t}, \quad (7)$$

wherein ΔP=requested power variation of the wind power plant, $J_{WF}$=total inertia of the wind power plant, $f_m$=measured network frequency and $k_2$ is a constant.

In a second strategy, the calculated output power variation of the synchronous machine equivalent is proportional to the current output power of the wind power plant, then the calculated output power variation will be dependent of the wind power plant production, and therefore of the rotational speed. The following calculation will be performed in the second calculation means 415:

$$\Delta P = J_{WF} * \omega_{WF} * k_1 * \frac{\Delta f}{\Delta t}, \quad (8)$$

wherein $\omega_{WF}$=a wind power plant equivalent rotational speed.

Such a strategy may be more suitable for the wind power plants for the following reasons: If less power is produced than the nominal power, the calculated ΔP is adapted accordingly; On the other hand, if more power is produced than the nominal power, more kinetic energy could be taken to be delivered to the power network. In this second strategy the calculated output power variation will be adapted to the power produced by the wind power plant in any moment.

The constants $k_2$ and/or $k_1$ can also be used to increase or decrease the value of the wind power plant inertia $J_{wf}$.

As illustrated by a switch 415a in FIG. 4, it may be possible to select if the first or the second strategy should be implemented.

Figure 5:
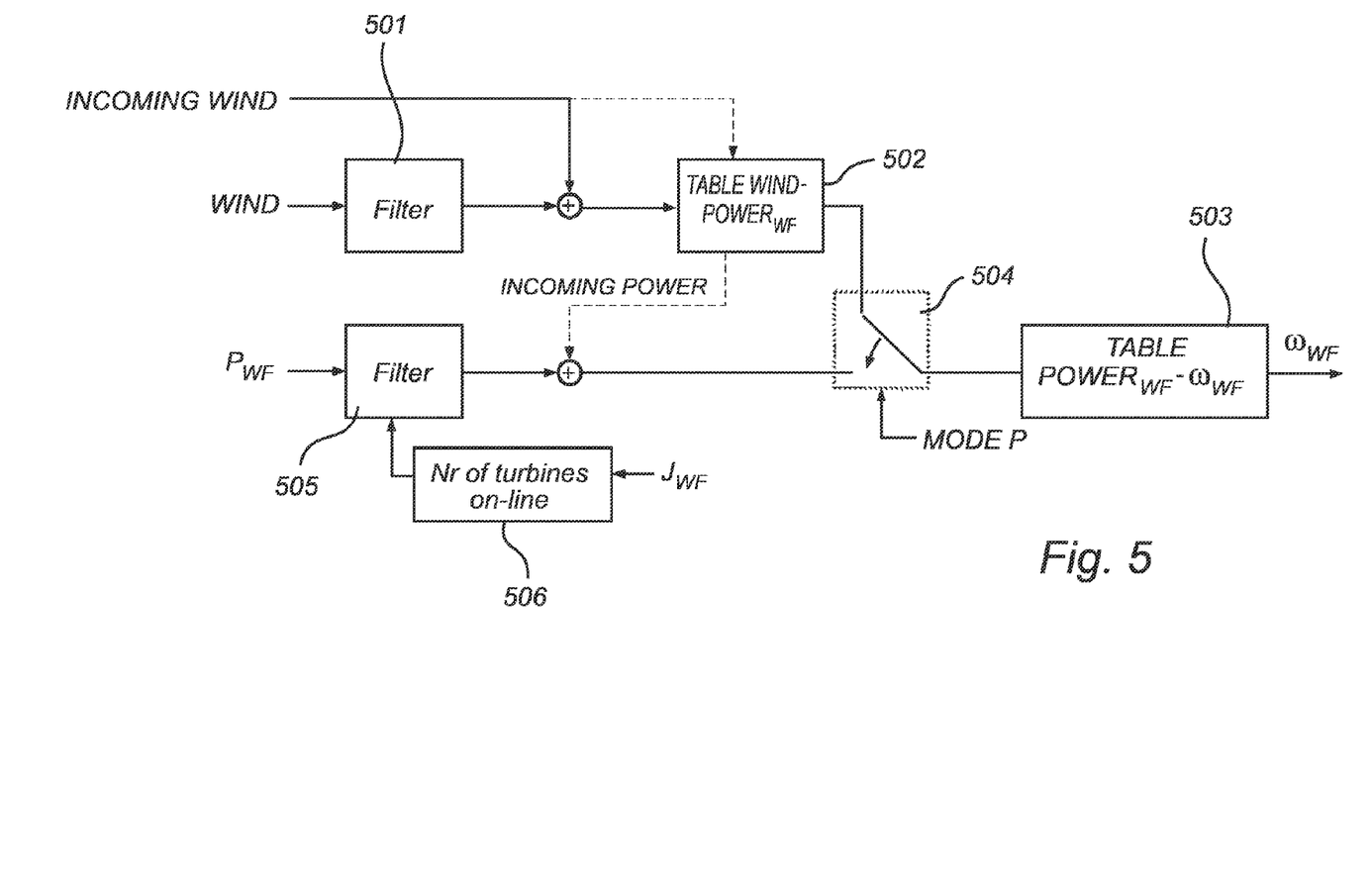
FIG. 5 shows a schematic block diagram of a wind power plant equivalent speed calculation unit according to the invention.

For implementing the second strategy, a variable proportional to energy residing in the rotational masses of the wind power plant is defined. According to an embodiment, this variable is the wind power plant equivalent rotational speed. In FIG. 5, an embodiment comprising two different alternative realizations for defining the wind power plant equivalent rotational speed is described using measurements of two different variables as input values for calculating the wind power plant equivalent speed.

According to the first alternative, measurements of the incoming wind speed is used as input value to a first translation unit 502 in which the incoming wind speed is translated into an equivalent total produced power of the wind power plant. For measuring wind speed, the wind power plant preferably has a number of separate masts comprising wind sensors. The wind measurements may be filtered in a first filter 501 before they are used in the first translation unit 502. Further on, the equivalent total produced power of the wind power plant is used as input value to a second translation unit 503 for translating the equivalent total produced power of the wind power plant into the current wind power plant equivalent speed.

According to the second alternative, the power $P_{WF}$ delivered by the wind power plant to the network is measured at a common coupling point of the wind power plant and used as input value in the second translation unit 503. The measured power may be filtered in a second filter 505 before used as input value in the second translation unit. The second filter may be controlled by information 506 of the number of turbines that are on-line. This information is used for power calculations in order to have the power per unit/turbine such that the correct $\omega_{wf}$ is calculated.

Further, in the embodiment of FIG. 5 it is possible to switch between the two alternatives by using a logic switch 504. Although, it would also be possible with embodiments of the invention, comprising only one of the alternatives.

The total inertia of the wind power plant may be calculated in different ways. According to an embodiment of the invention, the total inertia of the wind power plant is calculated as a summation of the inertia of each individual turbine comprised in the wind power plant.

$$\sum_{n=1}^{N} J_{WTn}$$

As mentioned, the control unit comprises a third calculation means 402 that, based on the requested variation of delivered power for the wind power plant and a current power level of each wind turbine generator, calculates the power variation of each WTG. According to an embodiment of this third calculation means 402, the calculation of power variation of the individual WTGs could be performed by a normal division taking account the number of WTGs. According to another embodiment, the power variation of the individual WTGs could be calculated by taking account of the wind power plant equivalent rotational speed $\omega_{WF}$ and using every individual rotational speed $\omega_i$ to calculate a gain for each WTG (see $K_i$ in FIG. 4, box 402).

According to an embodiment of the invention, the wind power plant may also comprise at least one power storage device. In this embodiment, the power storage device may be used to deliver energy to the power network when the calculated requested power variation is above a certain threshold level set depending on the total inertia of the wind power plant.

Similarly, if the calculated requested power variation suggests the delivered power to be much lower, the power storage device could be used to absorb energy delivered by the WTGs or even to absorb energy from the power network.

As a conclusion, the wind power plant control system can use; only the WTGs, the power storage device at the same time as the WTGs, or only the storage device.

If the storage device is used, the limits of the controller should be adapted to this extra capacity, using preferably the first strategy, defined in formula (7) for controlling the power plant.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for controlling a wind power plant comprising at least one wind turbine generator, the wind power plant being connected to a power network for delivering power to the power network, the method comprising:
   detecting, by a detection unit, a frequency of the power network;
   calculating, by a first calculation unit, a frequency variation rate in the detected frequency of the power network;
   calculating, by a second calculation unit, a requested variation of delivered power for the wind power plant based on a value of inertia of the wind power plant and the calculated frequency variation rate;
   calculating, by a third calculation unit, a requested variation of delivered power for each wind turbine generator of the wind power plant based on the calculated requested variation of delivered power for the wind power plant and a current power level of each wind turbine generator; and
   controlling, by a control unit, each wind turbine generator to deliver power to the power network based on the calculated requested variation of delivered power for each wind turbine generator.

2. The method according to claim 1, wherein the requested variation of delivered power for the wind power plant is further calculated using a value of the detected frequency of the power network.

3. The method according to claim 1, wherein the requested variation of delivered power for the wind power plant is further calculated based on a variable that is proportional to energy residing in rotational masses of the wind power plant.

4. The method according to claim 3, further comprising:
   detecting an incoming wind speed at the wind power plant, wherein the variable that is proportional to energy residing in rotational masses of the wind power plant is the detected incoming wind speed.

5. The method according to claim 3, wherein the variable that is proportional to energy residing in rotational masses of the wind power plant is the current power level delivered by the wind power plant to the power network.

6. The method according to claim 3, wherein the variable that is proportional to energy residing in rotational masses of the wind power plant is a current rotational speed at each wind turbine generator.

7. The method of claim 6, further comprising:
   detecting the current rotational speed at each wind turbine generator.

8. The method according to claim 1, further comprising:
   if the detected frequency is below a threshold minimum value, calculating the frequency variation rate by using the threshold minimum value instead of the detected frequency.

9. The method according to claim 1, further comprising:
   comparing the calculated frequency variation rate to a threshold value; and
   controlling each wind turbine generator according to the method only if the calculated frequency variation rate exceeds the threshold value.

10. The method according to claim 1, wherein the wind power plant further comprises a power storage device, and wherein the method further comprises:
    calculating a requested variation of delivered/absorbed power for the power storage device based on the calculated requested variation of delivered power for the wind power plant; and
    controlling the power storage device according to its requested power variation.

11. A system for controlling a wind power plant comprising at least one wind turbine generator, the wind power plant being connected to a power network, the system comprising:
    a detection unit configured to detect a frequency of the power network;
    a first calculation unit configured to calculate a frequency variation rate in the detected frequency of the power network;
    a second calculation unit configured to calculate a requested variation of delivered power for the wind power plant based on a value of inertia of the wind power plant and the calculated frequency variation rate;
    a third calculation unit configured to calculate for calculating a requested variation of delivered power for each wind turbine generator of the wind power plant based on the calculated requested variation of delivered power for the wind power plant and a current power level of each wind turbine generator; and
    a control unit configured to control each wind turbine generator to deliver power to the power network based on the calculated requested variation of delivered power for each wind turbine generator.

12. The system according to claim 11, wherein the second calculation unit is further configured to calculate a requested variation of delivered power for the wind power plant based on a value of inertia for the wind power plant, the calculated frequency variation rate and a value of the detected frequency of the power network.

13. The system according to claim 11, wherein the second calculation unit configured to calculate a requested variation of delivered power for the wind power plant based on a value of the inertia of the wind power plant, the calculated frequency variation rate and a variable that is proportional to energy residing in rotational masses of the wind power plant.

14. The system according to claim 13, further comprising:
    a detector configured to detect incoming wind speed at the wind power plant, wherein the variable that is proportional to energy residing in rotational masses of the wind power plant is incoming wind speed detected by the detector.

15. The system according to claim 13, wherein the variable that is proportional to energy residing in rotational masses of the wind power plant is the current total power level delivered by the wind power plant to the power network.

16. The system according to claim 11, further comprising:
    a comparison unit configured to:
    compare the calculated frequency variation rate to a threshold value, and filter out frequency variation rates that are below the threshold value.

17. The system according to claim 11, wherein the system comprises:
    a first calculation section configured to calculate the variation rate in the detected frequency of the power network for positive frequency variations; and
    a second calculation section configured to calculate the variation rate in the detected frequency of the power network for negative frequency variations.

18. The system according to claim 11, wherein the third calculation unit is further configured to calculate a requested variation of delivered/absorbed power for a power storage device included in the wind power plant based on the calculated requested variation of delivered power for the wind power plant.

19. The system of according to claim 18, wherein the control unit is further configured to control the power storage device based on the requested power variation of the power storage device.

20. A computer program product, comprising:
   a non-transitory computer readable storage medium; and
   program instructions stored on the computer readable storage medium and which, when executed by a processor, perform an operation, comprising:
      detecting, by a detection unit, a frequency of a power network;
      calculating, by a first calculation unit, a frequency variation rate in the detected frequency of the power network;
      calculating, by a second calculation unit, a requested variation of delivered power for a wind power plant based on a value of inertia of the wind power plant and the calculated frequency variation rate;
      calculating, by a third calculation unit, a requested variation of delivered power for each wind turbine generator of the wind power plant based on the calculated requested variation of delivered power for the wind power plant and a current power level of each wind turbine generator; and
      controlling, by a control unit, each wind turbine generator to deliver power to the power network based on the calculated requested variation of delivered power for each wind turbine generator.

* * * * *